United States Patent [19]

Nozawa et al.

[11] Patent Number: 4,977,230
[45] Date of Patent: Dec. 11, 1990

[54] HEAT-RESISTANT FILM OR SHEET

[75] Inventors: Seiichi Nozawa; Shigeo Utsumi; Michio Nakata, all of Kanagawa, Japan

[73] Assignees: Mitsubishi Chemical Industries Limited; Diafoil Company, Limited, both of Tokyo, Japan

[21] Appl. No.: 476,146

[22] Filed: Feb. 5, 1990

Related U.S. Application Data

[63] Continuation of Ser. No. 217,115, Jul. 11, 1988, abandoned, which is a continuation of Ser. No. 803,758, filed as PCT JP85/00112 on Mar. 6, 1985, published as WO85/03905 on Sep. 12, 1985, abandoned.

[30] Foreign Application Priority Data

Mar. 7, 1984 [JP] Japan ................... 59-41955
Mar. 7, 1984 [JP] Japan ................... 59-41956
Mar. 7, 1984 [JP] Japan ................... 59-41957
Mar. 9, 1984 [JP] Japan ................... 59-45274
Mar. 9, 1984 [JP] Japan ................... 59-45275
Sep. 5, 1984 [JP] Japan ................... 59-186054

[51] Int. Cl.$^5$ ..................... C08G 8/02; C08G 65/38
[52] U.S. Cl. ..................... 528/125; 528/126; 528/128; 528/219
[58] Field of Search ............... 528/125, 126, 128, 219

[56] References Cited

U.S. PATENT DOCUMENTS 3,928,295  12/1975  Rose ..................... 528/226
4,320,224  3/1982   Rose et al. .............. 528/125

Primary Examiner—John Kight, III
Assistant Examiner—P. Hampton-Hightower
Attorney, Agent, or Firm—Sughrue, Mion, Zinn, Macpeak & Seas

[57] ABSTRACT

A heat-resistant film or sheet produced by melt extruding polyether ketone having an intrinsic viscosity of at least 0.4 dl/g, which is obtained by heat treating an unstretched film or sheet which comprises (i) heat-treating to crystallization being not more than 60%, or (ii) uni- or biaxially stretching under specific conditions to an extent in which a stress at 5% elongation in the stretched direction is at least 13 kg/mm$^2$; an initial elastic modulus in the stretched direction is at least 600 kg/mm$^2$; and thermal shrinkages in a lengthwise direction and its vertical direction are not more than 4%.

The film or sheet of the present invention is excellent in such properties as heat resistance, mechanical strength and the like, and is suitable for use as a substrate for magnetic recording or electric insulation.

8 Claims, No Drawings

HEAT-RESISTANT FILM OR SHEET

This is a continuation Ser. No. 07/217,115, filed July 11, 1988 which is a Rule 62 continuation of application Ser. No. 06/803,758 filed as PCT JP85/00112 on Mar. 6, 1985, published as WO85/03905 on Sep. 12, 1985, both now abandoned.

FIELD OF THE INVENTION

The present invention relates to a heat-resistant film or sheet, and more particularly, to a polyether ketone film or sheet which is excellent in such properties as heat resistance and mechanical strength and thus is suitable for use as a substrate for magnetic recording or a film or sheet for electrical insulation.

BACKGROUND OF THE INVENTION

In recent years a polyethylene terephthalate-based film has been widely used in various industrial fields because of its excellent mechanical and electrical properties. In particular, as a substrate for a magnetic recording material, particularly an audio tape, a video tape, and a floppy disc, the material exhibits quite excellent characteristics. It is no exaggeration to say that the polyethylene terephthalate-based film is superior to all other films in respect of cost and performance.

However, in view of a recent tendency that the magnetic recording material is increased in a recording density and reduced in film thickness, it has been desired to develop a new film much superior to polyethylene terephthalate. In the case of a video tape, for example, it has been required to further increase the recording time and thus it has been attempted to reduce the thickness of the base film. With recent standardization of an 8 mm video tape which may be recorded by video camera, it has been increasingly demanded to miniaturize the unit and densify the recordings for selling in the market. In order to satisfy such requirements, it is sufficient for the magnetic tape to have a high strength in a longitudinal direction, while a suitable strength in a transverse direction.

Since there has been no suitable film, a polyester film having a strengthened tensile strength in a longitudinal direction (hereinafter referred to as a "tensilized film") has been used. It has now been revealed, however, that such tensilized films have various disadvantages.

The tensilized polyester film is stretched by techniques such as (1) a method of stretching the film in a transverse direction followed by stretching it in a longitudinal direction to a greater extent than in the transverse direction; (2) a method of biaxially simultaneously stretching the film followed by further stretching it in a longitudinal direction; and (3) a method of stretching the film in a longitudinal direction to a greater extent followed by stretching it in a transverse direction but to a lesser extent; and the like. In accordance with any of the above conventional methods, stretching is difficult and, furthermore, because of breakage, for example, continuous operation is difficult to carry out. It is assumed that a method for the most preferable continuous production and suitable longitudinally stretching tensilized film are to stretch in only a longitudinal direction and to heat-set without stretching in a transverse direction. A uniaxially stretched polyester film produced by the above stretching method is liable to fibrillate to be torn in a longitudinal direction and, therefore, is unsuitable for a magnetic recording tape. In the case of a polyester film, since it is necessary to stretch the film in a transverse direction when the above method is employed, the strength thereof in a longitudinal direction cannot be increased to a great extent. On the other hand, if the longitudinal strength thereof is intended to increase, productivity is seriously lowered because of its breakage, for example.

In the case of the tensilized polyester film, productivity is lowered as a result of breakage, for example, in producing a high strength film. Moreover, the higher the strength in a longitudinal direction is increased, the larger the thermal shrinkage, thereby lowering the dimensional stability.

Particularly for the purpose of densifying the recordings, a method of vapor depositing metal powder directly on a film is used in place of the conventional method of coating iron oxide together with a binder. Accordingly, it is necessary that low molecule polymers, and oligomers must not be extruded to the film surface and the film should be heated during the vapor deposition process. In the case of a polyester film, however, precipitation of oligomers inevitably occurs, and during the polyester longitudinally stretching step, the heat-setting step, the vapor deposition step, and the cooling step after vapor deposition, and so forth, the oligomers are formed, thereby causing "drop-out". Thus, the resulting film is unsuitable as a magnetic recording tape.

As a base film for magnetic recording tape, such as a vapor deposited video film, which is required to densify the recording, it has been desired to develop a film which is of high strength and excellent in heat resistance and dimensional stability, has reduced in the amount of oligomers precipitated, and can be produced in a stabilized manner.

As regards a floppy disc, it is also required to develop increasing the recording density with the tendency of compact disc. In the case of a method in which magnetic characteristics are improved in a metal vapor deposition and vapor deposition for vertical magnetization, it is desired that heat resistance is to be increased. In the case of a method in which the number of tracks is increased, it is desired that dimensional stability is to be improved by controlling irreversible changes due to a thermal or humid expansion and humidity and temperature.

On the other hand, a stretched film of polyethylene terephthalate has heretofore been used as an insulating or dielectric layer of an electric article in a large quantity because of its excellent mechanical and electrical properties, heat resistance, chemical resistance, and so forth.

However, the stretched film of polyethylene terephthalate has various defects and has been desired to be improved. That is, when the film is used for insulation of a motor or as a covering of an electric wire, if it is exposed to high temperature atmosphere for a long period of time, it is physically and chemically deteriorated, resulting in a deterioration in mechanical properties and insulation properties of the film. Thus, it has been desired to develop an insulating film having a high maximum permissible temperature. In the case of insulation of a motor for a refrigerator, plugging due to extracted oligomers by a coolant is a major cause for trouble, and thus a film free from extracted oligomers has been greatly desired.

In the case that a polyethylene terephthalate film is used as a dielectric material for a condensor, the dielectric loss tangent goes up above the temperature of about 100° C., which may be an upper limit of practically applicable temperature. This phenomenon is related with the glass transition temperature of the polyethylene terephthalate and depends on the characteristics of the material. Thus, a film which has a high glass transition temperature and is inexpensive is desired.

A polyethylene terephthalate film can be used as a flexible print circuit plate which is prepared by laminating a metallic layer on the film. This plate, however, has poor heat resistance and is not durable at temperatures above 260° C. at which soldering is usually applied. Thus, soldering can be applied only in a specific temperature range as low as 230 to 240° C. Accordingly, the plate has a disadvantage in that a soldered part is of low reliability. Under such circumstances, it has been desired to develop a film which has good heat resistance and is of good dimensional stability so as to be durable in a solder bath maintained at above 260° C.

In place of a glass substrate for a liquid crystal display panel, an amorphous film such as of polyether sulfone and the like or a uniaxially stretched film of polyethylene terephthalate and the like is being used. These films, however, have various disadvantages and have been desired to be improved. An amorphous film of, for example, polyether sulfone is advantageous in view of extinction because it is amorphous, but its chemical resistance and solvent resistance are extremely poor. Accordingly, during the formation of the substrate, difficulties are encountered in processings such as lamination and adhesion. In the case of a uniaxially stretched polyester film, since it is difficult to completely orient in one direction, its extinction is not sufficiently satisfactory, and it is difficult to apply working because its heat resistance is poor. Moreover, if the film is exposed to an elevated temperature for a long time, oligomers come out and appear on the surface of the film, resulting in a reduction in transparency of the film. Under such circumstances, it has been desired to develop a film which has good solvent resistance, is not oriented, is excellent in heat resistance, and is free from precipitation of oligomers.

As described above, when the polyethylene terephthalate film, for example, is used as an insulating layer or dielectric layer, it is desired to solve the above problems so as to improve heat resistance and to prevent precipitation of oligomers and the like.

In order to satisfy the above requirements, several films have been porposed, including a polyimide-based film, an aromatic polyamide-based film, etc. These films, however, have disadvantages in high production costs, poor chemical resistance, and dimensional stability at varying temperatures and humidities. Accordingly, it is desired to develop a film which can be produced by melt extrusion, has crystallinity, and is superior to a polyethylene terephthalate in heat resistance, mechanical properties and dimensional stability.

Japanese Patent Publication No. 42167/73, for example, discloses polyethylene-2,6-naphthalene dicarboxylate which is one of polyesters. This polymer, however, has not yet been put into practical use because its characteristics are not markedly excellent and it is expensive.

The present inventors have made extensive investigations to develop an industrial material which is of high strength and excellent in heat resistance so as to satisfy the above described objects, using polyether ketone which has a secondary transition point, 80° C. higher than that of polyethylene terephthalate, has a melting point, 100° C. higher than that of polyethylene terephthalate, and, furthermore, exhibits high crystallinity. As a result, they have succeeded in overcoming difficulties considered in obtaining the desired good film. Thus, they have accomplished the present invention.

DESCRIPTION OF THE INVENTION

The gist of the present invention resides in:

1. A heat resistant film or sheet having a degree of crystallinity of 60% or less, which is produced by melt extruding polyether ketone having a repeating unit represented by the following general formula (I):

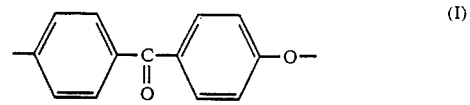

(I)

and having an intrinsic viscosity of at least 0.4 dl/g to prepare an unstretched film or sheet, and then heat treating the unstretched film or sheet;

2. A heat resistant film or sheet produced by melt extruding polyether ketone having a repeating unit represented by the general formula (I):

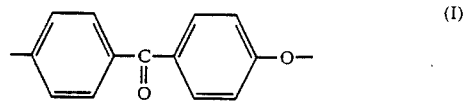

(I)

and having an intrinsic viscosity of at least 0.4 dl/g to produce an unstretched film or sheet, and
  (i) stretching the unstretched film or sheet to at least 3.0 times only in a longitudinal direction at a temperature from a secondary transition point up to 210° C., and then heat-setting the film or sheet at a temperature from 210° C. to below the melting point of the film or sheet, or
  (ii) stretching the unstretched film or sheet in longitudinal and transverse directions both to at least 1.5 times at the same time or in any desired order at a temperature from a secondary transition temperature up to 210° C., wherein a stress at 5% elongation in the stretched direction is at least 13 kg/mm$^2$, an initial tensile modulus at least in one direction is at least 600 kg/mm$^2$, and a coefficient of thermal shrinkage in longitudinal and transverse directions at 180° C. is not more than 4%;

3. A magnetic recording material having a substrate which is a film or sheet produced by uni- or biaxially orienting an unstretched film or sheet of polyether ketone having a repeating unit represented by the general formula (I):

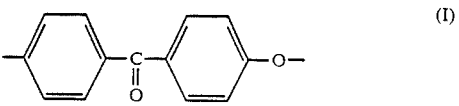

(I)

and having an intrinsic viscosity of at least 0.4 dl/g wherein a stress at 5% elongation in the stretched direction is at least 13 kg/mm$^2$, an initial tensile modulus at least in one direction is at least 600 kg/mm$^2$, and coefficients of thermal shrinkage in a lengthwise direction and in its transverse direction at 180° C. are not more than 4%; and 4. An electric article made from a film or sheet which is produced by melt extruding polyether ketone having a repeating unit represented by the general formula (I):

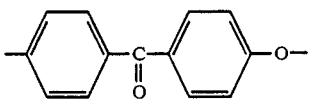
(I)

and having an intrinsic viscosity of at least 0.4 dl/g to produce an unstretched film or sheet and then heat treating the unstretched film or sheet so that the degree of crystallinity is not more than 60%.

The polyether ketone according to the present invention can be prepared by various methods such as a method in which para-phenoxybenzoyl chloride represented by the following formula:

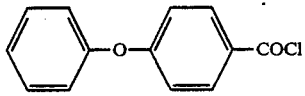

is polymerized in hydrogen fluoride in the presence of boron trifluoride.

Particularly preferred from a standpoint of lowering production costs is a method in which phosgene and diphenyl ether are polymerized in carbon disulfide in the presence of aluminum trichloride.

The polyether ketone of the present invention also includes polymers which are prepared by copolymerizing or modifying polyether ketone within a range that does not markedly deteriorate the characteristics thereof, polymer compositions prepared by blending, and so forth.

That is, the polyether ketone of the present invention includes a polymer represented by the general formula:

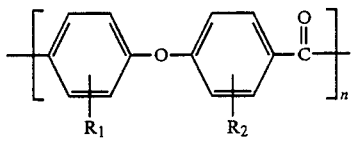

(wherein $R_1$ and $R_2$ are each a hydrogen atom, a halogen atom, an alkyl group, or the like).

It is also suitable to copolymerize the component of the above formula with a component represented by the general formula:

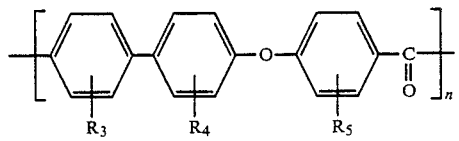

In the above formula, $R_3$, $R_4$ and $R_5$ may be any groups if they are allowable as in the case of $R_1$ and $R_2$. The copolymerization component is used usually in not more than 40 mol %, preferably in not more than 30 mol %, and especially preferably in not more than 20 mol %.

The polyether ketone may contain a matting agent such as titanium dioxide and the like, a stabilizer, a lubricant such as pulverized silica and china clay, and so forth.

In the present invention, polyether ketone having an intrinsic viscosity of at least 0.4 dl/g is used. The intrinsic viscosity as used herein means a value as determined in concentrated sulfuric acid at a concentration of 1.0 g/dl and a temperature of 30° C. Polymers having an intrinsic viscosity of less than 0.4 dl/g are not desirable because they fail to produce a useful film.

In the present invention, a substantially unoriented or unstretched film is produced using the above polyether ketone. The thickness of the unstretched film may be selected appropriately depending on the purpose of use thereof. For example, the film may be from a thin film having a thickness of several microns to a fairly thick film having a thickness of more than 0.5 mm. The unstretched film is molded by the usual melt film-making method. Preferably the polyether ketone is extruded from an extruder and quenched on a cooling roll or mandrel to mold it into a film or sheet of a single component. Also the polyether ketone may be molded into a laminated film or sheet by extrusion coating or extrusion laminating it over a cloth, an unwoven cloth, a net, or a foil made of an organic or inorganic polymer, a metal and the like. In this case, the extrusion temperature is usually 260 to 400° C. and preferably 300 to 380° C. The temperature of the cooling roll is usually 0 to 90° C. and preferably 20 to 80° C. Also in this case, in order to improve an unevenness in thickness, it is preferred to apply the electrostatic plating method.

The unstretched film thus produced is then subjected to heat treatment.

A crystallinity of the film after said heat treatment is usually not more than 60% and preferably 1 to 30%. It is quite difficult to produce a film having a crystallinity of less than 1%. On the other hand, if the crystallinity is more than 60%, the resulting film becomes brittle and is unsuitable. In applications where transparency is needed, the crystallinity should be not more than 10% and preferably not more than 5%.

The crystallinity (Xc) as used herein is determined by the following equation:

$$Xc\ (\%) = \frac{d - d_{am}}{d_{cr} - d_{am}} \times 100 = \frac{d - 1.272}{1.430 - 1.272} \times 100$$

(wherein d is a density of film; $d_{am}$ is a density of film in an amorphous part; and $d_{cr}$ is a density of film in a crystalline part).

The temperature in the heat treatment of the unstretched film is preferably from 100° C. to a melting point.

The heat resistant film or sheet thus produced is excellent in mechanical properties and heat resistance, and thus is suitable for use in production of electric articles such as a condensor, a print circuit substrate, a substrate of a liquid crystal display panel, and the like. Furthermore, the film or sheet may also be used in applications where transparency is needed.

Next, the uni- or biaxially oriented film or sheet of the present invention is described.

The uni- or biaxially oriented film or sheet is characterized in that a stress at 5% elongation in the stretching direction (that is, a lengthwise direction in the case of a uniaxially stretched film or sheet, and in the case of a biaxially stretched film or sheet, a lengthwise direction and its vertical direction) is at least 13 kg/mm², an elastic modulus in tension in the stretching direction is at least 600 kg/mm², and coefficients of thermal shrinkage in a lengthwise direction and its vertical direction are not more than 4%.

The above film or sheet is produced using an unstretched film or sheet as molded from the above described polyether ketone. The thickness of this stretched film can be selected arbitrarily. For example, those films including from a thin film having a thickness of several ten microns (μm) to a thin film having a thickness of more than 0.5 mm can be used. Since, however, a rate of crystallization of the polyether ketone is higher than that of polyester, it is necessary to pay attention to the quenching process. That is, it is necessary to pay attention so that no spherulite may be formed during the quenching process. In some cases, it is preferred to cool a film with water or to cool it by placing in ice.

The uniaxially oriented film of the present invention can be obtained by the steps of stretching the above unstretched film to at least 3.0 times of the initial strength.. only in the longitudinal direction at a temperature from a secondary transition point to not more than 210° C., and heat-setting the uniaxially stretched film at a temperature from 210° C. to below the melting point thereof. In the case of a polyester film to be used as a base film for a magnetic tape, if a film uniaxially stretched in the longitudinal direction followed by heat-setting is used, the film is readily fibrillated and torn out and, therefore, the uniaxial stretching heat-setting method is unsuitable. However, it has been found unexpectedly that in the case of the polyether ketone of the present invention, even if it is uniaxially stretched only in the longitudinal direction followed by heat-setting thereof, the resulting film does not cause fibrillation and its strength in the transverse direction is equal to or more than that of a biaxially stretched polyester film. In accordance with the uniaxial stretching heat-setting method, heat-setting is applied after stretching in the longitudinal direction. Therefore, as compared with a method of production of a tensilized film of a polyester film in respect of the strength in the same longitudinal direction, breakage is less caused and thus it is possible to produce a film in a stabilized manner and with high productivity.

The heat resistant uniaxially stretched film of the present invention, particularly a uniaxially stretched heat resistant film for magnetic recording, must have the following physical properties. The elastic modulus in tension in the longitudinal direction is at least 600 kg/mm², preferably at least 800 kg/mm², and more preferably at least 1,000 kg/mm². For this reason, the drawing ratio in the longitudinal direction is at least 3.0 times, preferably at least 4.0 times, and more preferably at least 4.5 times of the initial length. The temperature during the drawing operation must be from the secondary transition point to 210° C. Below the secondary transition point, if the drawing ratio is relatively low, necking drawing is brought out and a film having an unevenness in thickness is obtained. On the other hand, if the drawing ratio is high, the stretching stress is excessively increased and it becomes difficult to fix the stretching point. On the other hand, if the stretching temperature is above 210° C., the film is difficult to orient. If the drawing ratio is increased in order to improve orientation, crystallization proceeds excessively to undesirably cause breakage at the time of heat-setting.

Moreover, it is necessary that a thermal shrinkage in a lengthwise direction and its vertical direction be not more than 4%, preferably not more than 3%, and more preferably not more than 2%. In order to produce such films, the heat treatment is necessarily carried out at a temperature of from 210° C., preferably 230° C. and more preferably 250° C. to below the melting point. If the heat-setting is carried out at a temperature above the melting point, not only the orientation is relaxed but also the film melts and is broken. Thus, the heat-setting is necessarily carried out below the melting point. In the case that a production line of a polyester film is utilized in order to save a facility cost, it is preferable to carry out the heat-setting at not higher than 370° C. and preferably not higher than 280° C.

The film of the present invention has a quite low thermal shrinkage and excellent quality even though a high strengthening treatment is applied in the longitudinal direction, while the tensilized film of polyester has a disadvantage in having a high thermal shrinkage.

The film of the present invention is highly superior to the tensilized polyester film in consideration that no oligomers being precipitated. Precipitation of oligomers in the polyester film is, as described above, an inevitable phenomenon and is ascribable to the cause of drop out in the final magnetic recording tape. In other applications, the precipitation of oligomers exerts adverse influences. In the case of, in particular, a vapor deposition type 8 mm video film, the better the surface smoothness of the film, the more serious the problem of "drop out" due to the precipitation of oligomers becomes. In some cases, the film cannot be used as a magnetic recording tape. On the other hand, in the film of the present invention, such low molecular weight polymers do not precipitate at all to obtain good magnetic recording tape which is free from "drop out" due to such low molecular weight polymers.

The biaxially oriented film or sheet can be produced by biaxially stretching the above unstretched film or sheet in both longitudinal and transverse directions to at least 1.5 times of an initial length, simultaneously or in any desired order under a temperature from a secondary transition temperature to 210° C. If necessary, after the biaxial stretching, heat treatment may be applied at a temperature from 200° C. to below the melting point to obtain a biaxially oriented film having excellent physical properties.

In the case that the unstretched film is sequentially stretched by the sequential stretching method, it is preferred that the first stretching is carried out at a temperature of from the secondary transition point of polyether ketone to 210° C., and the stretching at later stages (stretching in a direction at right angles to the first stretching direction) is carried out at a temperature of not more than 210° C. and equal to or at least 5° C. higher than the stretching temperature of the former stage. Most suitably the average refractive index (hereinafter abbreviated to as "$\bar{n}$") after stretching at the former stage is not more than 1.750. Particularly in the case of the film according to the present invention, as described above, the crystallization is high and, therefore, during the cooling process after stretching, crystallization easily occurs. Since, if spherulites are formed, stretchability at the later stage is seriously hindered, it is very important to control $\bar{n}$. If the drawing ratio at each stretching is less than 1.5 times of the initial length, the desired strength and Young's modulus cannot be obtained and, furthermore, the evenness in thickness of the film obtained is seriously deteriorated. Accordingly, the film is unsuitable for practical use.

At the former stretching, if the stretching temperature is lower than the above secondary transition point, the stretching becomes so-called cold stretching and, therefore, the thickness of the film does not become even and a uniform film not having unevenness in thickness cannot be obtained. On the other hand, if the stretching temperature is in excess of 210° C., crystallization proceeds during the stretching process and, as a result, $\bar{n}$ after the former stretching becomes too high to hinder the latter stretching. In the case that the former stretching is carried out under the temperature between the secondary transition point and 210° C., depending on the chosen temperature, flow drawing occurs and in some cases, orientation cannot be achieved sufficiently. In this case, the former stretching is suitably carried out in multistages to obtain the desired $\bar{n}$ after the former stretching.

For the stretching at the later stage, the stretching temperature can be determined appropriately depending on the orientation of the film after the former, stretching. Preferably the stretching temperature at the later stage is set to be equal to or about 5° C. higher than the stretching temperature at the former stage. Particularly when $\bar{n}$ at the former stage is high, the stretching temperature at the later stage is preferably maintained at a high level.

In general, the secondary transition point of the polyether ketone shows 154° C. when measured with a differential scanning calorimeter (DSC).

The average refractive index $\bar{n}$, defined above, is an average value of a refractive index ($n_{65}$) in an axial direction in the film surface, a refractive index ($n_{62}$) in its vertical direction in the surface, and a refractive index ($n_{60}$) in a direction of thickness, all measured by an improved Abbe refractometer capable of measuring a higher refractive index at a light wavelength of 589 μm (center of the D ray) and a temperature of 20° C.

In order to obtain the film of the present invention by the above sequential stretching method, it is suitable that at the first stage, the stretching temperature is 154 to 210° C. and the drawing ratio is 1.5 to 5.0 and at the later stage, the drawing ratio is 1.5 to 6.0 The stretching rate can be changed within the range of 50 to 100,000%/sec at the longitudinal stretching step and within the range of 5 to 500%/sec at the transverse stretching step.

In the present invention, a sequential biaxial stretching method is most recommended in which the film is first stretched in the longitudinal direction followed by in the transverse direction. However, a sequential biaxial stretching method in reverse order, in which the film is stretched in the transverse direction first and then in the longitudinal direction, and a simultaneous biaxial stretching method is suitable provided that the stretching temperature is chosen to be equal to that of the first stretching step in the sequential biaxial stretching method. As the stretching equipment, a roll, a tenter, a tubular and so forth can be selected on demand. In order to improve the strength in the longitudinal direction, it is desirable to apply re-stretching, re-longitudinal/transverse stretching and so forth. The oriented film thus obtained has a high strength and a high Young's modulus, and is excellent in smoothness. If this film is heat treated under conditions as described hereinafter, its heat resistance and dimensional stability can be more improved.

That is, if a polyether ketone film biaxially stretched under the above conditions is heat-treated at a temperature from 200° C. to below the melting point, a more improved film can be obtained.

If the heat treatment temperature is lower than 200° C., the heat treatment time becomes too long to be suitable for practical use. On the other hand, if the temperature is higher than the melting point, the film melts and breaks.

The heat treatment may be carried out either under tension or under shrinkage. If it is carried out under shrinkage, a shrinkage of not more than 10% is preferred. If the shrinkage is more than 10%, orientation relax proceeds excessively thereby resulting in seriously lowering the mechanical strength.

In accordance with the present invention, by suitably selecting stretching conditions, if necessary, as well as heat treatment conditions, a film which is excellent in strength, heat resistance and dimensional stability, and which is inexpensive and can be used for general purposes, can be obtained. Thus, the film can be used, for example, as an electrical insulating material, a foodstuff wrapping material, a copying film, and a tracing film or sheet and the like. Particularly, in view of its good heat resistance, it is useful as a decorating material for walls, a building material and so forth. Furthermore, the film can be used in fields of an audio, a video, various photographic films, magnetic discs, and so forth. In particular, the film may be suitably used for a vapor deposition type 8 mm video and a vertical magnetic floppy disc and the like.

The film to be used as a substrate of the magnetic recording material of the present invention must have the following physical properties.

That is, the stress at 5% elongation in the stretching direction is at least 13 kg/mm² and preferably at least 15 kg/mm², the initial tensile modulus at least in one direction is at least 600 kg/mm² and preferably at least 800 kg/mm², and each thermal shrinkage in a lengthwise direction and in its vertical direction is not more than 4%, preferably not more than 3% and most preferably not more than 1%.

A magnetic recording material satisfying all the above three requirements is novel. Any of the known magnetic recording materials cannot satisfy all the requirements and they fail to satisfy any one of the requirements. For example, if a film having a high strength in both longitudinal and transverse directions is intended to be produced using polyethylene terephthalate, the thermal shrinkage becomes larger, while if the thermal shrinkage is intended to be decreased, the desired mechanical strength cannot be obtained. A film well balanced in strength of both the directions was very difficult to produce using polyethylene terephthalate.

Accordingly, the crystalline film of the present invention, which has excellent mechanical properties in both longitudinal and transverse directions and also excellent heat resistance and dimensional stability, is an epoch-making film. A magnetic recording material using the film of the present invention as a substrate satisfies all the requirements such as a reduction in size, a reduction in thickness, and an increase in density.

In forming a magnetic substance layer on the surface of a film, known methods commonly employed in producing a magnetic recording material can be employed.

For example, a method of forming a thin layer by coating a mixture of magnetic substance particles (for example, metal oxides or metallic elements such as cobalt and nickel) and a binder, and a method of directly fixing a metal by techniques such as vacuum deposition, ion plating or sputtering can be used.

If the heat resistant film of the present invention is designed to satisfy the requirements of surface smoothness falling within a specific range and also a coefficient of friction falling within a specific range, it is more improved in characteristics of workability and availability.

The heat resistant film of the present invention can be produced by conventional techniques such as T-die molding, inflation molding, and the like. It is further preferred that by changing a distribution of size of inorganic particles added, particle size and an amount added, the surface roughness, Ra value, be controlled.

Inorganic particles can be added at any desired point. It is preferred that the inorganic particles be added at the time of pelletization by extruding a melt after washing out catalyst in polymerization of polyether ketone. Besides these, the particles may also be added to polyether ketone at the time of metal extrusion into a film or sheet by dispersing therein in an extruder followed by extruding the mixture. It is also suitable that a mixture of pellets to which inorganic particles are added in excess of a given amount is used as a master batch pellets and is blended with the starting material of polyether ketone.

In order that the film is excellent in workability and smoothness without being deteriorated in use characteristics, it is necessary for the Ra value (unit: $\mu m$) to indicate the surface roughness of the film and a coefficient of dynamic friction ($\mu d$) of the surface of the film to satisfy the following two equations.

$$0.008 \leq Ra \leq 0.090 \quad (I)$$

$$0.12 \leq \mu d \leq 0.5 \quad (II)$$

For this purpose, it is necessary that inorganic particles be controlled in type, particle size, amount and so forth so as to satisfy the above two equations, and added.

That is, surface properties satisfying the equations (I) and (II) can be obtained by combining the type, particle size, distribution of size, amount, etc., of inorganic pigments depending on the purpose.

The particle size varies depending on the type of inorganic particles and the purpose. Usually, those particles having an average particle size of about 0.5 to 10 $\mu m$ are used. The amount of inorganic particles added cannot be determined unconditionally because it varies depending on the distribution of particle-size, particle size and so forth. Usually, it is preferred that the amount of inorganic particles added be 0.01 to 2 wt %. A nature of these inorganic particles is not limited as long as they are insoluble in and inactive with a thermoplastic resin, that is, they are inert inorganic particles. Substances which can be added include inorganic oxides such as magnesium oxide, zinc oxide, magnesium carbonate, calcium carbonate, calcium phosphate, calcium sulfate, barium sulfate, aluminum oxide, silicon dioxide, titanium oxide, kaolin, and diatomaceous earth and the like; inorganic salts, aluminosilicate, carbon black and the like.

If Ra is less than 0.008, workability and running properties are improved only insufficiently. On the other hand, if Ra is more than 0.090, electric characteristics of a magnetic tape are poor, and voltage resistance of a condensor is poor. The optimum value of Ra varies depending upon the use. For example, in the case of a video tape, it is preferred that $0.008 \leq Ra \leq 0.030$. In the case of an audio tape, it is preferred that $0.015 \leq Ra \leq 0.050$. When the film is used in a condensor, it is preferred that $0.020 \leq Ra \leq 0.070$. When the film is used for enveloping, it is preferred that $0.050 \leq Ra \leq 0.090$. In this manner, it is preferred that the value of Ra be determined appropriately depending on the purpose of use.

In general, the greater an Ra, the lower a coefficient of dynamic friction ($\mu d$). With the same Ra value, ($\mu d$) sometimes varies depending on such factors as a distribution of particle size and size per se. For this reason, along with the range of Ra, the requirement of ($\mu d$) being 0.12 to 0.5 should be satisfied. If ($\mu d$) is more than 0.5, slipperiness is deteriorated and workability cannot be expected to be improved. On the other hand, if ($\mu d$) is less than 0.12, the film becomes too slippery and, therefore, during the winding of the film and the winding or rewinding of the final film product, slipping and displacing thereof undesirably occur.

The film of the present invention is free from precipitation of low molecular weight products such as oligomers unlike a polyester film. Accordingly, the film of the present invention is suitable for use in, for example, magnetic recording and electric insulation, and a condensor.

As a medium suitable for high density magnetic recording, it is suitable that Ra is not more than the above defined value. A magnetic medium having such characteristics will hereinafter be explained.

That is, such a magnetic recording medium is a film or sheet produced by stretching an unstretched film or sheet of a composition in one direction comprising polyether ketone and inorganic particles, wherein one surface of the film or sheet satisfies the requirements that the surface roughness (Ra) is not more than 0.008 $\mu m$, the maximum projection height (PV) is not more than 0.05 $\mu m$, the height is more than 0.27 $\mu m$, and the number of projections having a height of not more than 0.54 $\mu m$ is not more than 0.2 per square millimeter and is provided with a ferromagnetic metal film, and on the other surface, a lubricant layer is provided.

The ferromagnetic metal film can be formed by known techniques. In particular, the vacuum deposition method, the ion plating method, the sputtering method, the gas phase growth method, and the non-electrolytic plating method are preferably used.

In the vacuum deposition method, a metal to be vapor deposited which is placed in a tungsten board or an alumina hearth is evaporated by techniques such as resistance heating, high frequency heating and electron beam heating and then vapor deposited on the above substrate. As the metal to be vapor deposited, Fe, Ni, Co and their alloys are usually used. In the present invention, the reaction vapor deposition method in which Fe is vapor deposited in an $O_2$ atmosphere to form an iron oxide thin film can be employed. In the ion plating method, DC glow discharge or PF glow discharge is applied in an atmosphere mainly composed of inert gas of $10^{-4}$ to $10^{-3}$ Torr and during the discharge, a metal is evaporated. As the inert gas, Ar is usually used. In the sputtering method, glow discharge is applied in an atmosphere composed mainly of Ar of $10^{-2}$ to $10^{-1}$ Torr, and with Ar ions thus formed, atoms on the target surface are driven out. Glow discharge is effected by the two- or three-pole DC-sputtering method and the high frequency sputtering method. In addition, the magnetron sputtering method can be employed. By the nonelectrolytic plating method, a Co-P or Co-Ni-P plated film is formed.

The thickness of the ferromagnetic metal film of the present invention should be such that a sufficient signal output may be produced as a high density magnetic recording medium. Thus the thickness of the ferromagnetic metal film is preferably between 0.02 and 1.5 μm (200 to 15,000 Å) although it varies with the thin film forming method and the purpose of use.

The state of surface of the metal thin film formed by techniques such as vapor deposition, sputtering, and plating is such that irregularities of a non-magnetic substrate may appear on the surface as they are. Thus, it is necessary to design the surface coarseness of the non-magnetic substrate.

If the average surface roughness (Ra) of the surface of the non-magnetic substrate is not more than 0.008 μm, the maximum projection height (PV) is not more than 0.06 μm, and the number ($N_1$) of projections having a height ranging between 0.27 μm and 0.54 μm is not more than 0.2 per square millimeter, when the film is used as a metal thin film magnetic recording medium, noise is greatly reduced and the noise level is markedly excellent. Preferably the average surface roughness (Ra) is not more than 0.005 μm, the maximum projection height (PV) is not more than 0.05 μm, and the number ($N_1$) of projections having a height ranging between 0.27 μm and 0.54 μm is substantially zero. The lower limits of Ra and PV are not critical and usually about 0.003 μm and 0.01 μm, respectively. If the both surfaces of the film have such properties, the blocking phenomenon occurs and thus it is unsuitable for practical use. For this reason, in order to impart sliding properties to the opposite surface relative to the surface on which the ferromagnetic metal film has been provided, a solution of a lubricant dispersed in water or a solvent is coated to form a lubricant layer. As the method for forming a lubricant layer, it is possible to provide in an operation line or out of the operation line by coating, for example, after or before heat-setting. It is particularly preferred that coating be applied in the operation line before the transverse stretching. In coating a lubricant, it is suitable to make smooth by adding inorganic fine particles to the coating solution or by making so that after the transverse stretching and heat setting, particle or waveshaped, or mountain-shaped or like projections may be formed.

In the case that particle- or mountain- or wave-shaped projections are formed as well as the lubricant layer, it is preferred for the surface characteristics to be $0.010 \leq Ra \leq 0.020$ and $0.06 \leq PV \leq 0.25$. Usually, in the case of film of polyester, if one surface is roughened and the other surface is made flat, irregularities are transferred to the smooth surface during the winding process and the smooth surface may be roughened, as a result of which the film becomes unsuitable for use as a film for vapor deposition. On the other hand, in the case of the present film, such transfer of irregularities as in the polyester film does not occur. Although the reason for this is not clear, it is considered due to the fact that the surface of the film is hard.

A method of easily making the surface state of the substrate on which the ferromagnetic metal film is to be formed is to add inorganic fine particles to a polymeric material.

As these inorganic fine particles, an inert substance which is insoluble in and unreactive with the above thermoplastic resin is used.

The desired surface characteristics can be obtained by controlling size, amount and the like of inorganic particles to be added in combination. The particle size varies with the type of the inorganic particles and the purpose of use. Usually it is about 0.5 to 10 μm. The amount of the inorganic particles added varies with a distribution of particle size and cannot be determined unconditionally. Usually, it is preferably 0.01 to 2 wt %.

In providing the lubricant layer on the non-magnetic substrate, as well as the above coating method, a method of lamination, for example, is preferably used.

Lubricants which can be used include organic lubricants such as sorbitan, organic polymeric lubricants such as tetrafluoroethylene, etc., and inorganic lubricants such as alumina, kaolin, silica, molybdenum sulfide and the like.

In order to improve coating properties, it is preferred to add and mix a polymeric binder and a surfactant.

In the film of the present invention, unlike the polyester film, low molecular weight products such as oligomers are not precipitated. Thus, the film is completely free from drop out due to such low molecular weight products.

In accordance with the present invention, as described above, a film can be obtained which is excellent in strength, dimensional stability and heat resistance as a metal thin film magnetic recording medium, is less subject to drop out as a magnetic tape, and is excellent in running properties and electric characteristics.

The heat resistant film or sheet of the present invention has the following advantages.

(i) In the case that the film is unstretched, it exhibits quite excellent heat resistance, solvent resistance, insulating properties and so forth when used as an electric insulating film or sheet.

The film is quite excellent in that even if the unstretched film or sheet is crystallized, loss of transparency due to whitening and deterioration in mechanical strength and tearing properties as encountered in an unstretched film or sheet of polyethylene terephthalate do not occur although the film is made of crystallizable polymer.

Furthermore, since stretching is not applied, large sized equipment or apparatus is not needed, and working efficiency is very good. Thus, the film can be supplied as a very inexpensive product.

Accordingly the film is suitable as an electric insulation or dielectric film or sheet to be used in electric articles such as a motor, a transducer, a condensor, an electric wire, a cable, a communication device, a flexible print circuit, a substrate for a liquid crystal display panel, a substrate for a floppy disc, and a substrate for an optical disc.

(ii) In the case of uniaxial orientation:

The film has a high strength in the longitudinal direction, is excellent in dimensional stability, and is free from precipitation of low molecular weight products. Thus, the film, when used as a substrate for magnetic recording, is much superior to those of the prior art. In particular, the film is useful as a material which is required to have a high strength in the longitudinal direction, such as a magnetic recording tape, an image recording tape, a condensor, a typewriter ribbon, a punching tape, a wrapping tape, an adhesive tape, and a substrate for a liquid crystal panel. Moreover, the film of the present invention may be covered or laminated with other material.

(iii) In the case of biaxial orientation:

A magnetic recording material, particularly a magnetic recording tape which is produced using the heat resistant film of the present invention has mechanical properties, and heat resistance and dimensional stability which are much superior to those of the prior art.

BEST MODE FOR REDUCING PRACTICE OF THE INVENTION

The present invention is described in greater detail with reference to the following examples, although the present invention is not limited thereto unless it is out of the scope of the invention.

Properties of the film were measured by the following methods.

(1) Average Roughness (Ra)

A part of the film having a standard length L (2.5 mm) along a center line was taken as a specimen. The center line was determined so as to occupy approximately equal area above and beneath thereof, which is surrounded with a surface line in cross section and said center line.

The surface line in cross section, i.e., a roughness curve, was represented by y=f(x), provided that X-axis and Y-axis were taken in the center line and a longitudinal stretched direction, respectively.

An average roughness based on a center line (Ra) is calculated by the equation shown below in terms of μm.

$$Ra = \frac{1}{L} \int_0^L |f(x)| dx$$

In this case, the cut-off value was 80 μm.

In the experiment, average value was obtained from the results at ten points; five points in a longitudinal direction and five points in a transverse direction.

(2) Surface Roughness

Projections on the surface of the film on which aluminum was vapor deposited were quantitatively measured as a number of primary and secondary interference fringes by the multiple interference method (measuring wavelength: 0.54 μ) using a surface finish microscope (produced by Nippon Kogaku Co., Ltd.), and indicated as number per 1 mm².

$N_1$: Number of projections as observed as interference fringes of $0.27 \leq h \leq 0.54$ μm (3) Coefficient of Friction (μd)

The film was brought into contact with a fixed hard chromium-plated metallic roll (diameter: 6 mm) at a contact angle of 135° (θ), and while applying a load of 53 g ($T_2$) on one end of the tape, it was run at a line speed of 1 m/min. The resistance ($T_1$ (g)) on the other end of the film was measured, and the coefficient of friction during running was calculated by the following equation:

$$\mu d = \frac{1}{\theta} l_n \left(\frac{T_1}{T_2}\right) = 0.424 \, l_n \left(\frac{T_1}{53}\right)$$

(4) $F_5$ Value

A film sample having a width of ½ inch and a length between chucks of the testing machine having 50 mm was stretched at a speed of 50 mm/min under conditions of 20° C. and 65% RH by the use of a tensilon (UTM-III produced by Yoyo Baldwin Co., Ltd.). A load at 5% elongation was divided by an initial cross-sectional area, and indicated in a unit of kg/mm².

EXAMPLE 1

Polyether ketone having an intrinsic viscosity of 0.8 dl/g which was produced by polymerizing phosgene and diphenyl ether at a ratio of 5:1 in carbon disulfide in the presence of aluminum trichloride by the usual process was extruded to produce unstretched films having various thicknesses. At this time, the crystallization was 3%.

This film is nominated as Sample A. Sample A was heat treated at 250° C. for 7 seconds to obtain a film having a crystallization of 15% (Sample B). Sample B became opaque as a result of crystallization but still maintained good flexibility.

A polyethylene terephthalate-based unwoven cloth impregnated with a heat resistant varnish of an epoxy resin type was laminated on both sides of Sample B and dried at 100° C. for 30 minutes. This laminated film was inserted into a groove of electric iron core, through which a conductor was placed and its top was fixed with a slot key. The whole iron core was impregnated by dipping with the varnish in a vessel and then hardened by heating. Using the electric iron core thus obtained, an electric motor was assembled. This motor showed heat resistance better than B type and had good characteristics as an electric motor.

EXAMPLE 2

Sample B used in Example 1 was superposed on an aluminum foil and wound to produce 300 condensors of 0.1 microfarad.

For comparison, 300 condensors were produced using a biaxially stretched film of polyethylene terephthalate. These condensors were allowed to stand for 30 days in an atmosphere maintained at 100° C. under the condition that a DC voltage of 350 volts was applied thereto. The number of condensors happened to insulative breakage during 30 days was as follows.

Condensors using the polyether ketone film: 1

Condensors using the polyethylene terephthalate film: 10

EXAMPLE 3

A polyether ketone resin was extrusion-coated on a 35 μ thick electrolytic copper foil (TTO produced by Furukawa Circuit Foil Co., Ltd.) by the use of an extruder having 40 mm φ in diameter to produce a laminated film having a film thickness of 70 μ. This laminated film was crystallized by heat treating at 250° C. for 10 seconds. Using this laminated film, a circuit was produced by the etching method. This circuit was treated in a soldering bath at 260° C. for 60 seconds. Separation and peeling did not occur. Furthermore, the circuit has good electric properties.

EXAMPLE 4

Sample A of Example 1 was used as a substrate for a liquid crystal displaying panel. By the usual manner, a liquid crystal was charged, and a transparent electrically conductive film and a polarizing film were laminated thereon to produce a liquid crystal display panel.

The panel thus produced was an excellent product free from interference fringes.

On the other hand, with a uniaxially stretched film of polyethylene terephthalate and a film of polyether sulfone, transparency was lost under the same conditions as above and extinction was poor. Interference fringes were formed, and the surface of the film was deformed due to attack by a solvent. Thus, these films were unaccepted.

EXAMPLE 5

An unstretched film was produced using polyether ketone obtained by the usual manner. The secondary transition point was 154° C. and the melting point was 367° C. This unstretched film was stretched to 3.5 times, 4.0 times or 4.5 times of the initial length in the longitudinal direction at 175° C., placed in a tentor as such, followed by heat setting at 260° C. or 320° C. to produce a film having a thickness of 10 μm. The characteristics of each film thus obtained are shown in Table 1.

TABLE 1

| Longitudinal Drawing Ratio | 3.5 | | 4.0 | | 4.5 | |
|---|---|---|---|---|---|---|
| Heat Fixation Temperature (°C.) | 260 | 320 | 260 | 320 | 260 | 320 |
| Initial Tensile Modulus in Longitudinal Direction (kg/mm$^2$) | 780 | 750 | 900 | 840 | 1,030 | 980 |
| Thermal Shrinkage in the Longitudinal Direction at 180° C. for 1 Minute (%) | 1.8 | 1.5 | 2.0 | 1.7 | 2.3 | 2.0 |
| Thermal Shrinkage in the Transverse Direction at 180° C. for 1 Minutes (%) | 1.1 | 1.0 | 1.4 | 1.2 | 1.7 | 1.5 |
| Elongation at Break in the Transverse Direciton (%) | 42 | 23 | 38 | 19 | 30 | 15 |
| Fibrillation | No | No | No | Slightly occurred | No | Slightly occurred |

As a control, a polyester film having an initial tensile modulus of 800 kg/mm$^2$, which was produced by the re-stretching method, was measured for a thermal shrinkage at 180° C. for 1 minute. The thermal shrinkage in the longitudinal direction was as high as 18%.

A polyethylene terephthalate film was stretched to 4.0 times of the initial length only in the longitudinal direction by the usual manner and heat set at 220° C. to produce a uniaxially stretched polyethylene terephthalate film. It was found that the elongation in the transverse direction was 5% and extremely low, and fibrillation occurred.

Each film was heat treated at 150° C. for 30 minutes. For the polyester film, it became opaque as a result of precipitation of oligomers to the surface of the film. On the other hand, for the film of polyether ketone of the present invention, such precipitation of oligomers on the film surface did not occur at all and its transparency remained unchanged.

The number of breakage during the process of production of a high strengthened film by uniaxial stretching of the polyether ketone film of the present invention was 0 to 1 per day. This is greatly small as compared with 10 per day for the tensilized film of polyester by the re-stretching method.

EXAMPLE 6

An unstretched film was produced using polyether ketone produced by the usual manner. The secondary transition point was 138° C. and the melting point was 320° C. The intrinsic viscosity was 0.75 d(/g. This unstretched film was stretched to 4.0 times of the initial length in the longitudinal direction at 160° C. and then heat set at 300° C. to produce a film having a thickness of 10 μm. Characteristics of the film are shown in Table 2 below.

TABLE 2

| | |
|---|---|
| Initial Tensile Modulus in the Longitudinal Direction | 950 kg/mm$^2$ |
| Thermal Shrinkage in the Longitudinal Direction at 180° C. for 1 Minute | 2.3% |
| Thermal Shrinkage in the Transverse Direction at 180° C. for 1 Minute | 1.9% |
| Elongation in the Transverse Direction | 83% |

EXAMPLE 7

Polyether ketone having an intrinsic viscosity of 0.81 dl/g was synthesized by polymerizing phosgene and diphenyl ether at a molar ratio of 5:1 in carbon disulfide in the presence of aluminum trichloride by the usual manner. Using this unstretched film having various thicknesses, the unstretched film was produced.

The unstretched film thus obtained was first stretched in the longitudinal direction at a stretching temperature of 175° C. at a drawing ratio of 1.4 times (Run No. 1), 2.5 times (Run No. 2), 3.3 times (Run No. 3) and 4.3 times (Run No. 4) of the initial length, and then stretched in the transverse direction to 3.2 times at the same temperature, followed by heat setting at 350° C. for 20 seconds to produce a final film, biaxially stretched heat-set film having a thickness of 15 μm. Physical properties of the films are shown in Table 3 below.

TABLE 3

| Run No. | Longitudinal Stretching Conditions | | Transverse Stretching Conditions | | n̄ after Longitudinal Stretching | Unevenness in Thickness in the Longitudinal Direction after Biaxial Stretching | Stretchability Stretching Mode |
|---|---|---|---|---|---|---|---|
| | Temp. | Drawing Ratio | Temp. | Drawing Ratio | | | |
| 1 | 175° C. | × 1.4 | 175° C. | × 3.2 | 1.690 | 20% | Formation of wrinkles in the longitudinal direction. |

TABLE 3-continued

| Run No. | Longitudinal Stretching Conditions Temp. | Drawing Ratio | Transverse Stretching Conditions Temp. | Drawing Ratio | $\bar{n}$ after Longitudinal Stretching | Unevenness in Thickness in the Longitudinal Direction after Biaxial Stretching | Stretchability Stretching Mode |
|---|---|---|---|---|---|---|---|
| 2 | 175° C. | × 2.5 | 175° C. | × 3.2 | 1.700 | 8% | Whitening occurred during heat setting. Good |
| 3 | 175° C. | × 3.3 | 175° C. | × 3.2 | 1.710 | 6% | Good |
| 4 | 175° C. | × 4.3 | 175° C. | × 3.2 | 1.755 | — | During the transverse stretching, breakage occurred frequently. |

It can be seen from Table 3 that from a viewpoint of unevenness in thickness, the drawing ratio in the longitudinal direction should be at least 1.5 times, and $\bar{n}$ after the longitudinal stretching should be not more than 1.750.

EXAMPLE 8

In the same manner as in Example 7, a 180 μm thick unstretched film was produced. The intrinsic viscosity of the film was 0.65 dl/g, and its secondary transition temperature was 154° C. The unstretched film was stretched to 3.5 times of the initial length in the longitudinal direction at various stretching temperatures and then stretched to 3.4 times in the transverse direction at 180° C. and, thereafter, the same heat setting as in Example 7 was applied to produce a 15 μm thick film. The longitudinal stretching temperature was 150° C. (Run No. 1), 175° C. (Run No. 2), 200° C. (Run No. 3) and 220° C. (Run No. 4). Stretching was carried out under the conditions shown in Table 4. The results are shown in Table 4.

TABLE 4

| Run No. | Longitudinal Stretching First Stage Temp. | Drawing Ratio | Second Stage Temp. | Drawing Ratio | Transverse Stretching Temp. | Drawing Ratio | Stretchability, Stretching Mode |
|---|---|---|---|---|---|---|---|
| 1 | 150° C. | × 3.5 | — | — | — | — | In the longitudinal stretching the film became turbid by cold stretching |
| 2 | 175° C. | × 3.5 | — | — | 180° C. | × 3.4 | Good |
| 3 | 200° C. | × 1.75 | 180° C. | × 2.0 | 180° C. | × 3.4 | Good |
| 4 | 220° C. | × 3.5 | — | — | — | — | In the longitudinal stretching, the film was partially whitened, and in the transverse stretching, it was broken. |

It can be seen from Table 4 that with regard to the longitudinal stretching temperature, it is necessary to stretch at a temperature of from the secondary transition point of polyether ketone to 210° C. inclusive.

EXAMPLE 9

A 200 μm thick unstretched film was produced in the same manner as in Example 7. This unstretched film was stretched to 3.7 times of the initial length in the longitudinal direction at 175° C., to 3.3 times in the transverse direction at 180° C. and then heat set at various temperatures to obtain a biaxially stretched film. Physical properties of each film are shown in Table 5 below.

TABLE 5

| Run No. | Heat Setting Temp. (°C.) | Time (sec.) | Direction | $F_5$ Value*[1] (kg/mm²) | Young's Modulus (kg/mm²) | Coefficient of Thermal Shrinkage*[2] (%) |
|---|---|---|---|---|---|---|
| 1 | 200 | 10 | Longitudinal | 17.0 | 700 | 5 |
|   |   |   | Transverse | 14.0 | 520 | 4 |
| 2 | 250 | 10 | Longitudinal | 16.8 | 680 | 3.2 |
|   |   |   | Transverse | 14.0 | 500 | 2.9 |
| 3 | 300 | 10 | Longitudinal | 16.7 | 680 | 2.0 |
|   |   |   | Transverse | 13.5 | 480 | 1.5 |
| 4 | 350 | 10 | Longitudinal | 15.0 | 600 | 1.2 |
|   |   |   | Transverse | 12.0 | 450 | 1.0 |

Note:
*[1] Strength at 5% elongation
*[2] Coefficient of free shrinkage at 180° C. for 1 minute It can be seen from Table 5 that heat setting permits to produce a film having a high strength in both longitudinal and transverse directions and excellent in dimensional stability.

EXAMPLE 10

An unstretched film produced from polyether ketone having an intrinsic viscosity of 0.75 was first stretched to 3.5 times of the initial length in the longitudinal direction at 175° C. and then to 3.5 times in the transverse direction at 180° C. and, thereafter, heat set at 320° C. The film thus obtained was compared with a polyethylene terephthalate film for a magnetic tape on the market. The results are shown in Table 6.

TABLE 6

|  | Polyether Ketone | | Polyethylene Terephthalate | |
| --- | --- | --- | --- | --- |
|  | Longi-tudinal Direction | Trans-verse Direction | Longi-tudinal Direction | Trans-verse Direction |
| Film Thickness ($\mu$m) | 10 | | 15 | |
| Stress at 5% Elongation (kg/mm$^2$) | 16.5 | 16.5 | 11.0 | 12.0 |
| Young's Modulus (kg/mm$^2$) | 680 | 720 | 480 | 510 |
| Coefficient of Thermal Shrinkage at 180° C. for 1 Minute (%) | 1.5 | 1.2 | 8.0 | 10.0 |

A composition consisting of needle-like magnetic iron oxide and a binder was coated in a thin thickness on the above films and then solidified to produce magnetic tapes. By comparison of these tapes, it can be seen that they are equal to each other in strength; in connection with dimensional stability, particularly under conditions of high temperature and high humidity, the magnetic tape using a substrate of polyether ketone was superior to the magnetic tape using a substrate of polyethylene terephthalate; and that the length of the former tape which can be placed in a case is much longer than that of the latter tape which can be placed in the same case as above.

On the other hand, cobalt or nickel was vacuum deposited to produce a magnetic tape. In the case of the polyethylene terephthalate film, it is necessary to maintain a cooling drum placed at the opposite side to an evaporation source, under room temperature in terms of curling and dimensional deformation of the film. On the other hand, in the case of the polyether ketone film, even if the drum temperature is increased to 130° C., no problem occurs. The vapor deposited film thus obtained was excellent in adhesion between magnetic substance layer and the film.

EXAMPLES 11 AND 12

An unstretched film was produced using polyether ketone produced by the usual manner. Its secondary transition point was 154° C. and the melting point was 367° C. This unstretched film was stretched first to 3.4 times of the initial length in the longitudinal direction at 175° C. and then to 3.4 times in the transverse direction at 180° C. and then heat set at 320° C. to obtain a 15 $\mu$m thick film (Example 11).

The same unstretched film as above was stretched to 3.4 times in both longitudinal and transverse directions simultaneously at 185° C. followed by heat setting at 300° C. to obtain a 15 $\mu$m thick film (Example 12).

Characteristics of each film thus obtained are shown in Table 7 below.

TABLE 7

|  | Example 11 | Example 12 |
| --- | --- | --- |
| Stress at 5% Elongation in the Longitudinal Direction (kg/mm$^2$) | 15.2 | 14.8 |
| Stress at 5% Elongation in the Transverse Direction (kg/mm$^2$) | 15.5 | 15.0 |
| Initial Tensile Modulus in the Longitudinal Direction (kg/mm$^2$) | 630 | 600 |
| Thermal Shrinkage in the Longitudinal Direction at 180° C. (%) | 1.5 | 1.6 |
| Thermal Shrinkage in the Transverse Direction at 180° C. (%) | 1.0 | 1.6 |

On the surface of this film was coated a composition consisting of known magnetic particles and a binder to form a thin layer. In this way, a magnetic recording tape was produced.

This magnetic recording tape was compared with a commercially available magnetic recording tape using as a substrate a polyethylene terephthalate film having a stress at 5% elongation in both the longitudinal and transverse directions of about 15 kg/mm$^2$. The thermal shrinkage of the commercially available tape at 180° C. for 1 minute was as high as 15% in the longitudinal direction.

EXAMPLE 13

Powdered polyether ketone obtained by the usual manner was melted and pelletized after addition of 0.05 wt % of kaolin having an average particle size of 0.8 $\mu$m.

These pellets were extruded to produce a 185 $\mu$m thickness of unstretched film. This unstretched film had a secondary transition point of 154° C. and a melting point of 367° C. This unstretched film was stretched first to 3.6 times of the initial length in the longitudinal direction at 170° C. and then to 3.4 times in the transverse direction at 180° C. followed by heat setting at 320° C. to produce a 15 $\mu$m thick film. For the film thus obtained, the $F_5$ value was 16 kg/mm$^2$ and the thermal shrinkage at 180° C. for 10 minutes was as low as 1.5%. Thus, it was found that the film was a heat resistant film of high strength. For this film, Ra was 0.015 and ($\mu$d) was 0.32.

During the production of the film, neither scratches nor wrinkles were formed and it could be wound without any problem in workability.

This film was coated with a magnetic thin layer of known magnetic particles and a binder to produce a magnetic recording tape. This magnetic recording tape was mounted on a commercially available video deck. It was found that the tape was excellent in running properties and electric characteristics (e.g., S/N ratio, output and envelop).

EXAMPLE 14

Powdered polyether ketone obtained by the usual manner was melted and pelletized after addition of 0.20 wt % of calcium carbonate having an average particle size of 0.53 $\mu$m. These pellets were extruded to produce a 155 $\mu$m thick unstretched film. This unstretched film was biaxially stretched in the same manner as in Example 13. Ra was 0.035 and ($\mu$d) was 0.23.

During the production of this film, no problem arose.

Aluminum was vapor deposited on the above produced film, which was then slit to 1.20 mm width and wound on an element. This element was made flat by pressing. At this time, the dielectric breakdown voltage was 350 kg/mm. This was much superior to a condensor produced using a polyester film which was produced by the usual manner using the same particles as used above. The end surface of the element was uniform.

COMPARATIVE EXAMPLES 1 AND 2

A 15 μm thick film was produced in the same manner as in Example 13 except that 0.008 wt % of silica having an average particle size of 0.5 μm and 0.002 wt % of kaolin having an average particle size of 0.8 μm were added.

Ra was 0.007 and μd was 0.48 (Comparative Example 1). When this film was wound on a master roll, slit and then rewound, marks of grains were formed. Examination of the surface of the film thus obtained showed that scratches and wrinkles were formed on the surface. Thus, it was found that the film could not be used in any field.

A 15 μm thick film was produced in the same manner as in Example 13 except that 0.012 wt % of kaolin having an average particle size of 0.8 μm and 0.001 wt % of calcium carbonate having an average particle size of 1 3 μm were added (Comparative Example 2).

Ra was 0.0082 and μd was 0.52. This film was also poor in workability as in the film of Comparative Example 1 and could not be used in any field.

COMPARATIVE EXAMPLE 3

A 12 μm thick film was produced in the same manner as in Example 14 except that 0 50 wt % of silica having an average particle size of 2.10 μm and 0.50 wt % of calcium carbonate having an average particle size of 3.8 μm were used. At this time, Ra was 0.092 and μd was 0.12. When the film was wound during the production thereof, it slided to the direction of width and it was impossible to wind the film in such a manner that the end surface was uniform.

EXAMPLE 15

Composition I

In melting powdered polyether ketone obtained by the usual manner, 0.5 wt % of calcium phosphate particles comprising 3.0% of $1.5 \geq d > 0.5$ (unit: μm), 33.7% of $0.5 \geq d > 0.2$, and 63.3% of $0.2 \geq d$ were added, and then pelletization was conducted.

Composition II

After adding 0.5 wt % of kaolin comprising 4.8% of $1.5 \geq d > 0.5$, 43.6% of $0.5 \geq d > 0.2$ and $0.2 \geq d$, pelletization was conducted.

Compositions I and II were coextruded in such a manner that the ratio of layer of Composition I to layer of Composition II in the laminate was 1:1 to thereby produce an unstretched film having a thickness of 185 μm. The secondary transition point was 154° C. and the melting point was 367° C. This unstretched film was stretched first to 3.6 times in the longitudinal direction at 170° C. and then to 3.4 times in the transverse direction at 180° C. and then heat set at 320° C. In this way, a 15 μm film was produced.

Before heat setting, the above biaxially stretched film was coated on one surface with a coating solution, having the following formulation.

| | |
|---|---|
| Amyl acrylate (P-3 produced by Asada Kagaku Co., Ltd.) 2 wt % solution | 12 kg |
| Polyethylene glycol (molecular weight: 19,000; produced by Nippon Yushi Co., Ltd.) 2 wt % solution | 5 kg |
| Polyethylene glycol diglycidyl ether (NER010 produced by Nagase Sangyo Co., Ltd.) 2 wt % solution | 2 kg |
| Polyoxyethylene nonylphenyl ether 2 wt % solution | 1 kg |

The amount of the solution coated was about 2.2 g/m² as calculated as the solution and about 0.0126 g/m² as solids. The film thus obtained had good sliding properties, was free from blocking and could be wound smoothly. For this film, the stress at 5% elongation in the longitudinal direction was 16.0 kg/mm², and the initial elastic modulus in the longitudinal direction was 700 kg/mm². The coefficient of thermal shrinkage at 180° C. for 10 minutes was as low as 1.5%. Thus, it was found that the film was a heat resistant film of high strength. A coefficient of temperature expansion at room temperature was $5 \times 10^{-6}$ mm/mm/° C. and a coefficient of humidity expansion was $0.8 \times 10^{-6}$ mm/mm/RH%. Thus, it was found that the film was excellent in environmental stability. The Ra value was 0.0045 μm for one surface and 0.015 μm for the other surface (lubricant-coated surface). The PV value was 0.04 μm for one surface and 0.20 μm for the other surface. $N_l$ was 0.37/mm² for one surface and 13.0/mm² for the other surface.

This film was placed in a vacuum chamber and was subjected to ion bombarding treatment in an Ar gas atmosphere of $10^{-2}$ Torr. Then, the vacuum chamber was evacuated to the order of $10-2$ Torr. While running the film, a Co-Ni alloy (Co: 75 wt %; Ni: 25 wt %) was vapor deposited thereon at an incident angle of at least 70° by the oblique vapor deposition method and by the electron beam deposition to thereby produce a film having a thickness of 0.15 μm. In this way, tape having a thin layer of ferromagnetic metal was produced. This magnetic tape was mounted on a home video apparatus on the market, Beta-Max, and was subjected to 100 runnings and still tests. As a result, it was found that the tape was excellent in both electric characteristics and running properties, was excellent in the adhesion force between the magnetic layer and the film, and there was no increase in drop out. At this time, the lubricant-coated surface of the film had a μd of 0.06, that is, it had a greatly small coefficient of friction.

COMPARATIVE EXAMPLE 4

A film was produced in the same manner as in Example 15. A lubricant was coated on one surface (vapor deposited surface of Example 15) and a magnetic layer was formed in the same manner as in Example 15 on the other surface (lubricant-coated surface of Example 15). As a result, since irregularities in the magnetic surface were too large, the output was seriously reduced and thus the tape was unsuitable as a magnetic tape.

COMPARATIVE EXAMPLE 5

The particles as used in Example 15 were added to polyethylene terephthalate, which were then coextruded to produce a 15 μm thick film. In the case of this film, the punching phenomenon due to application of heat frequently occurred during the ion bombarding treatment and vapor deposition treatment. For this reason, it was impossible to produce a long tape. The tape was mounted on Beta-Max and run. As a result of multistage running and still running, the magnetic layer was partially broken or peeled apart. Thus, it was found that the adhesion force between the polyethylene terephthalate film and the metal layer was poor.

We claim:

1. A heat resistant film or sheet obtained by treating an unsaturated film or sheet produced by melt extruding polyether ketone polymer or copolymer having a repeating unit represented by the general formula (I):

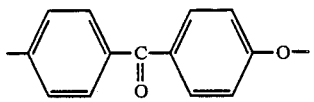
(I)

and having an intrinsic viscosity of at least 0.4 dl/g, said copolymer comprising up to 40 mol % of a copolymerization component, said treatment comprises:
  (i) stretching the unstretched film or sheet to at least 3.0 times of the initial length only in a longitudinal direction at from the secondary transition point to 180° C. followed by heat setting the film or sheet at a temperature of from 210° C. to below the melting point of the film or sheet, or
  (ii) stretching the unstretched film or sheet in longitudinal and transverse directions both to at least 1.5 times of the initial width at the same time or in any desired order at from the secondary transition temperature to 180° C., wherein a stress at 5% elongation in the stretched direction being at least 13 kg/mm$^2$, an initial tensile modulus at least in one direction is at least 600 kg/mm$^2$, and a thermal shrinkage in longitudinal and transverse directions at 180° C. is not more than 4%.

2. The heat-resistant film or sheet according to claim 1, wherein the film is produced in the sequential stretching process, which comprises first uniaxial stretching to obtain a uniaxially stretched film or sheet having an average refractive index of not more than 1.750 and further stretching in a direction vertical to said uniaxial stretching direction.

3. The heat resistant film or sheet according to claim 1 or 2, wherein the film is further heat-treated at a temperature from 200° C. to below the melting point after the biaxial stretching step.

4. A heat-resistant film or sheet produced by forming an unstretched film or sheet using a composition consisting of polyether ketone and inorganic non-fibrous particles, said unstretched film or sheet being stretched at least in one direction followed by optically heat setting, and having an Ra value indicating the surface roughness and a friction μd thereof satisfying the following equations:

$$0.008 \leq Ra \leq 0.090$$

$$0.12 \leq \mu d \leq 0.50$$

5. A magnetic recording material composed of a substrate which comprises film or sheet oriented unstretched film or sheet of polyether ketone polymer or copolymer in one or two axial direction, the polyether ketone having a repeating unit or the general formula:

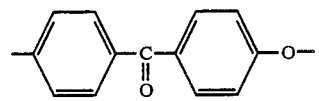
(I)

and intrinsic viscosity of at least 0.4 dl/g, said copolymer comprising up to 40 mol % of a copolymerization component, characterized by having a stress of 13 kg/mm$^2$ or higher in 5% elongation in stretching direction, an initial elastic modulus of 600 kg/mm$^2$ or higher at least in one direction, and a thermal shrinkage of 4% or less in longitudinal and transverse directions at 180° C.

6. The magnetic recording material according to claim 5, wherein a stress at 5% elongation of the substrate film or sheet is at least 13 kg/mm$^2$ in both a lengthwise direction and vertical direction thereof.

7. A magnetic recording medium which comprises a non-magnetic support in the form of a film or sheet made of a crystalline polymeric compound and a ferromagnetic metal film on one side thereof, said non-magnetic support being produced by stretching an unstretched film or sheet of polyether ketone at least in one direction and having a lubricant layer formed on another side thereof, one surface of the film or sheet satisfying the requirements that the surface roughness (Ra) is not more than 0.008 μm, the maximum projection height (PV) is not more than 0.05 μm, and the number of projections having a height of from 0.27 to 0.54 μm is not more than 0.2 per square centimeter.

8. A method for producing a heat resistant film or sheet comprising:
  melt extruding a polyether ketone polymer or copolymer having a repeating unit represented by general formula (I)

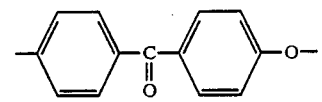
(I)

and having an intrinsic viscosity of at least 0.4 dl/g, said copolymer comprising up to 40 mol % of a copolymerization component, to obtain an unsaturated film or sheet, and
  treating the unsaturated film or sheet by
    (i) stretching the unstretched film or sheet to at least 3.0 times of the initial length only in a longitudinal direction at from the secondary transition point to 180° C. followed by heat setting the film or sheet at a temperature of from 210° C. to below the melting point of the film or sheet, or
    (ii) stretching the unstretched film or sheet in longitudinal and transverse directions both to at least 1.5 times of the initial width at the same time or in any desired order at from the secondary transition temperature to 180° C.,
  wherein a stress at 5% elongation in the stretched direction being at least 13 kg/mm$^2$, an initial tensile modulus at least in one direction is at least 600 kg/mm$^2$, and a thermal shrinkage in longitudinal and transverse directions at 180° C. is not more than 4%.

* * * * *

UNITED STATES PATENT AND TRADEMARK OFFICE
CERTIFICATE OF CORRECTION

PATENT NO. : 4,977,230

DATED : December 11, 1990

INVENTOR(S) : Seiichi NOZAWA et al

It is certified that error appears in the above-identified patent and that said Letters Patent is hereby corrected as shown below:

IN THE CLAIMS:   In column 25, claim 1, line 2, delete "unsaturated" and insert therefor --unstretched--.

Signed and Sealed this

Fourth Day of August, 1992

Attest:

DOUGLAS B. COMER

Attesting Officer

Acting Commissioner of Patents and Trademarks